United States Patent [19]

Nakanishi et al.

[11] Patent Number: 5,789,334
[45] Date of Patent: Aug. 4, 1998

[54] MICROPARTICLE CATALYSTS FOR HYDROSILYLATION REACTIONS AND THERMOSETTING SILICONE COMPOSITIONS CONTAINING SAID CATALYST

[75] Inventors: Junji Nakanishi; Toshio Saruyama; Atsushi Togashi, all of Chiba Prefecture, Japan

[73] Assignee: Dow Corning Toray Silicone Co., Ltd., Tokyo, Japan

[21] Appl. No.: 706,031

[22] Filed: Aug. 30, 1996

[30] Foreign Application Priority Data

Aug. 31, 1995 [JP] Japan ................ 7-246619

[51] Int. Cl.⁶ ........................... B01J 31/00
[52] U.S. Cl. ............ 502/159; 502/158; 502/150; 502/339
[58] Field of Search .................. 502/159, 158, 502/150, 339

[56] References Cited

U.S. PATENT DOCUMENTS

| | | | |
|---|---|---|---|
| 4,421,903 | 12/1983 | Ashby | 502/159 |
| 4,481,341 | 11/1984 | Schlak et al. | 525/478 |
| 4,791,186 | 12/1988 | Janik et al. | 528/15 |
| 4,847,228 | 7/1989 | Saruyama | 502/158 |
| 5,015,691 | 5/1991 | Lewis et al. | 525/100 |
| 5,015,716 | 5/1991 | Togashi et al. | 528/15 |
| 5,017,654 | 5/1991 | Togashi | 525/100 |
| 5,064,916 | 11/1991 | Sasaki et al. | 528/15 |
| 5,153,160 | 10/1992 | Saruyama et al. | 502/159 |
| 5,270,422 | 12/1993 | Hoag et al. | 528/15 |
| 5,494,750 | 2/1996 | Fujioka | 428/402.21 |

FOREIGN PATENT DOCUMENTS

| | | |
|---|---|---|
| 347895 | 12/1989 | Australia . |
| 49-134786 | 12/1974 | Japan . |
| 45468 | 2/1989 | Japan . |
| 47442 | 2/1989 | Japan . |
| 51140 | 2/1989 | Japan . |
| 07026147 | 1/1995 | Japan . |
| 41678 | 2/1995 | Japan . |

Primary Examiner—Walter D. Griffin
Assistant Examiner—Nadine Preisch
Attorney, Agent, or Firm—Paul J. Lagattuta; Larry A. Milco

[57] ABSTRACT

A microparticle catalyst for hydrosilylation reactions which contains microparticles of an average particle diameter of 0.1 to 20 μm made of a metallic catalyst for hydrosilylation reactions; a disiloxane having the general formula $(R^1R^2ArSi)_2O$, wherein, $R^1$ is an alkenyl group, $R^2$ is a monovalent hydrocarbon group and Ar is an aryl group; and a resin having a glass transition temperature of 40° to 200° C. and thermosetting silicone composition containing the microparticle catalyst.

15 Claims, No Drawings

MICROPARTICLE CATALYSTS FOR HYDROSILYLATION REACTIONS AND THERMOSETTING SILICONE COMPOSITIONS CONTAINING SAID CATALYST

BACKGROUND OF THE INVENTION

1. Field of the Invention

This invention relates to microparticle catalysts for hydrosilylation reactions and thermosetting silicone compositions containing said catalyst. In particular, this invention relates to microparticle catalysts for hydrosilylation reactions of high catalytic activity and to thermosetting silicone compositions of superior storage stability which can be maintained in an unhardened state for long periods.

2. Description of the Related Art

Thermoplastic resin catalysts that contain metallic catalysts for hydrosilylation reactions and thermosetting silicone compositions that contain such catalysts as the curing catalyst are known. For example, microparticle catalysts comprised of metallic catalysts for hydrosilylation reactions and thermoplastic silicone resins having softening points or melting points on the order of 40° to 200° C. have been proposed in Japanese Patent Application (Kokai or Unexamined ) No. 49-134786 (1974), Japanese Patent Application (Kokai or Unexamined) No. 58-37053 (1983) and Japanese Patent Application (Kokai or Unexamined) No. 2-4833 (1990). In Japanese Patent Application (Kokai or Unexamined) No. 2-9448 (1990), a granular catalyst is proposed that is comprised of a metallic catalyst for hydrosilylation reaction and a silicone resin having a softening point of 50° to 200° C. Microparticle catalysts comprised of metallic catalysts for hydrosilylation reactions and organic resins have also been proposed in Japanese Patent Application (Kokai or Unexamined) No. 58-37053 (1983), Japanese Patent Application (Kokai or Unexamined) No. 64-45468 (1989), Japanese Patent Application (Kokai or Unexamined) No. 64-47442 (1989), Japanese Patent Application (Kokai or Unexamined) No. 64-51140 (1989), Japanese Patent Application (Kokai or Unexamined) No. 3-68659 (1991) and Japanese Patent Application (Kokai or Unexamined) No. 7-41678 (1995). However, the metallic catalysts of these microparticle catalysts are easily decomposed by heating operations during manufacture, with catalytic activity being decreased. Even when the quantity of decomposition is very slight and sufficient catalytic activity can be obtained, discoloration due to the decomposition products cannot be avoided. Moreover, when these microparticle catalysts are used as a curing catalyst in an organosiloxane composition, there is the problem that hardening of this composition proceeds during storage and that an unhardened state cannot be maintained for a long period.

The inventors conducted intensive studies. As a result, they arrived at this invention by discovering that the aforementioned problems could be solved when a metallic catalyst for hydrosilylation reactions and specified disiloxanes are present together in the aforementioned microparticle catalysts for hydrosilylation reactions.

Specifically, the objective of this invention is to provide a microparticle catalyst for hydrosilylation reactions of superior catalytic activity and to provide a thermosetting silicone composition of superior storage stability that can be stored in unhardened state for long periods.

SUMMARY OF THE INVENTION

This invention relates to a microparticle catalyst for hydrosilylation reactions comprising:

(i) a metallic catalyst for hydrosilylation reactions having 0.01 to 5 wt % of metal atoms;

(ii) 0.1 to 5 wt % of a disiloxane having the general formula $$(R^1R^2ArSi)_2O,$$

where $R^1$ is an alkenyl group, $R^2$ is a monovalent hydrocarbon group and Ar is an aryl group; and (iii) a resin having a glass transition temperature of 40° to 200° C.

This invention also relates to a thermosetting silicone composition comprising:

(A) 100 parts by weight of organopolysiloxane that contains an average of at least two silicon-bonded alkenyl groups per molecule;

(B) an organohydrogenpolysiloxane that contains an average of at least two silicon-bonded hydrogen atoms per molecule, the quantity of this component that is compounded being an amount such that the ratio of the number of moles of silicon-bonded hydrogen atoms in this component and of the number of moles of silicon-bonded alkenyl groups in component (A) is in the range of 0.5/1 to 10/1; and (C) 0.005 to 100 parts by weight of a microparticle catalyst for hydrosilylation reactions comprising (i) a metallic catalyst for hydrosilylation reactions having 0.01 to 5 wt % of metal atoms;

(ii) 0.01 to 5 wt % of a disiloxane having the general formula $$(R^1R^2ArSi)_2O,$$

where $R^1$ is an alkenyl group, $R^2$ is a monovalent hydrocarbon group and Ar is an aryl group; and (iii) a resin having a glass transition temperature of 40° to 200°;

wherein said microparticle catalyst has an average particle diameter of 0.1 to 20 μm.

DETAILED DESCRIPTION OF THE INVENTION

First, we shall present a detailed description of the microparticle catalyst for hydrosilylation reactions of this invention.

The metallic catalyst for hydrosilylation reactions of this invention should be a metallic catalyst having catalytic activity as a catalyst for hydrosilylation reactions. Examples of this type of catalyst include, but are not limited to platinum catalysts, such as chloroplatinic acid, alcohol modified chloroplatinic acid, complexes of platinum and olefins; complexes of platinum or chloroplatinic acid and diketones; complexes of platinum or chloroplatinic acid and divinyl disiloxane and platinum carried on alumina, silica and carbon black; palladium catalysts such as tetrakis (triphenylphosphine) palladium; and metallic catalysts such as rhodium, nickel and cobalt. Of these, platinum catalysts are preferred and complexes of platinum and divinyl disiloxane are particularly preferred from the standpoint of the level of catalytic activity. These catalysts can be used individually or as mixture of two of more of said catalyst. A catalyst that has been dissolved in a liquid may also be used. When a complex of platinum and divinyl disiloxane is used, it may be dissolved in an alcohol, a hydrocarbon solvent or a polysiloxane that is a liquid at normal temperature. The quantity of said metallic catalyst for hydrosilylation reactions in the microparticle catalyst of this invention should be 0.01 to 5 wt %, and, preferably, 0.05 to 2 wt %, as metal atoms. When the content is less than 0.01 wt %, the quantity that is added to the composition that hardens the microparticle catalyst of this invention by the hydrosilylation reaction is excessive and the inherent properties of said composition are lost. When it exceeds 5 wt %, it is difficult to maintain the metallic catalyst for the hydrosilylation reaction in the microparticle catalyst of this invention.

The microparticle catalysts of the present invention are characterized by the presence of a disiloxane having the general formula $(R^1R^2ArSi)_2O$.

The disiloxane acts to stabilize the metallic catalyst of the microparticle particle catalyst of the present invention. When a microparticle catalyst containing such a disiloxane is added to a composition that cures via a hydrosilylation reaction, the composition can be maintained in an uncured state for a long period. In the above formula, $R^1$ is an alkenyl group, preferably a vinyl group or an allyl group. Of these, vinyl groups are particularly preferred. $R^2$ is a monovalent hydrocarbon group. $R^2$ is exemplified by, but not limited to, alkyl groups, such as a methyl group or an ethyl group; alkenyl groups, such as a vinyl group or an allyl group; and aryl groups, such as a phenyl group or a naphthyl group. Ar is an aryl group, a phenyl group or a naphthyl group. Of these, phenyl groups are preferable. Examples of disiloxanes that can be used in the present invention include, but are not limited to, syn-divinyldimethyldiphenyldisiloxane, syn-divinyltetraphenyldisiloxane and syn-tetravinyldiphenyldisiloxane. The amount of disiloxane present in the microparticle catalyst of the present invention is 0.1 to 5 wt %. When the amount of disiloxane is less than 0.1 wt %, the effect of the disiloxane cannot be manifested. When the amount of disiloxane present in the microparticle catalyst exceeds 5 wt %, compositions that contain the microparticle catalyst tend to harden during storage.

The resin that is used in the microparticle catalyst of this invention should not be a substance that poisons the metallic catalyst for hydrosilylation reactions. Examples of resins that can be used in the microparticle catalyst of the present invention include, but are not limited to, silicone resins, polysilane resins, polycarbonate resins, acrylic resins such as polymethyl acrylate and copolymers of methyl methacrylate and butyl methacrylate, polyester resins, polyethylene, polystyrene, polyvinyl chloride, polyvinylidene chloride, copolymers of polyvinyl chloride and polyvinylidene chloride, polyamides, cellulose esters such as cellulose acetate and cellulose acetate butyrate. Silicone resins can include, for example, resins comprised of monophenylsiloxane units, diphenylsiloxane units and dimethylsiloxane units, resins comprised of monophenylsiloxane units and dimethylsiloxane units and resins comprised of monophenylsiloxane units and methylvinylsiloxane units. Polysilane resins can include, for example, resins comprised of methylphenylsilane units and dimethylsilane units. It is necessary that the glass transition point of these resins be in the range of 40° to 200° C. When the glass transition point of the resin is less than 40° C., the manufacture of the microparticle catalysts of this invention is difficult and the compositions that contain the microparticle catalyst cannot be stored for long periods in an unhardened state. When the glass transition point exceeds 200° C., the cure rate of the composition containing the microparticle catalyst is not sufficient. The aforementioned resins are all thermoplastic resins. Resins that are generally classified as thermosetting resins can also be used. Thermosetting resins that are useful in the present invention must also have glass transition points within the range of 40° to 200° C. The glass transition point can be determined using a DSC (differential scanning calorimeter).

The microparticle catalyst of the present invention has an average particle diameter of 0.1 to 20 μm. When the average particle diameter is less than 0.1 μm, the storage stability of compositions containing the microparticle catalyst is not sufficient. When the average particle diameter exceeds 20 μm, the cure of compositions containing the microparticle catalyst is not uniform. There are no particular limitations on the shape of the microparticle catalyst of the present invention. However, a spherical form is desirable for obtaining good reproducibility of stable catalytic activity inhibition and manifestation of catalytic activity.

Methods of manufacturing the microparticle catalyst of this invention include, for example, a method in which the metallic catalyst, the disiloxane and the resin are dissolved in a solvent such as toluene, after which a resin containing the metallic catalyst and the disiloxane is manufactured by drying away the solvent (see Japanese Patent (Kokai or Unexamined) No. 58-37053 (1983)); a method in which the metallic catalyst, the disiloxane and the resin are dissolved in a solvent having a low boiling point such as methylene chloride, chloroform, tetrahydrofuran or diethyl ether, the solution is added dropwise to an aqueous solution of a surfactant to make an oil and water type emulsion, solid microparticles are produced by gradually removing the solvent and the microparticles are recovered (see Japanese Patent (Kokai or Unexamined) No. 2-4833 (1990); and a method in which the metallic catalyst, the disiloxane and the resin are dissolved in a solvent such as toluene or dicyclomethane, said solution is sprayed into a hot air stream, with the solvent being volatilized and with the resin containing the metallic catalyst and the disiloxane in the spray state being solidified (see Japanese Patent (Kokai or Unexamined) No. 4-29748 (1992)). The microparticle catalyst of this invention that is obtained in this way may be used in unaltered form or the metallic catalyst that is present on the surface of the particles may be removed by washing using a solvent such as methyl alcohol, ethyl alcohol, hexamethyl disiloxane and octamethylcyclotetrasiloxane that dissolves the metallic catalyst without dissolving the resin.

Next, we shall present a detailed description of the thermosetting silicone composition of this invention.

Component (A), which is an organopolysiloxane, is the component which forms the principal agent of the composition of this invention and has an average of at least two silicon-bonded alkenyl groups per molecule. Examples of the alkenyl groups include vinyl groups, allyl groups and hexenyl groups. Examples of organic groups that are bonded with the silicon atom in addition to the alkenyl group in the organopolysiloxane include alkyl groups, such as methyl groups, ethyl groups, propyl groups, butyl groups, hexyl groups and octyl groups; aryl groups, such as phenyl groups; and monovalent hydrocarbon groups as exemplified by substituted hydrocarbon groups such as 3,3,3-trifluoropropyl groups. The number of organic groups that are bonded to the silicon atom should be an average of 1.0 to 2.3. This organopolysiloxane is generally a straight chain but may also have some branched chains. The viscosity of this organopolysiloxane at 25° C. should be in the range of 10 to 1,000,000 centipoise. Examples of the organopolysiloxanes that constitute this component include dimethylpolysiloxane blocked at both terminals by dimethylvinylsiloxane groups, dimethylsiloxane-methylvinylsiloxane copolymers blocked at both terminals by trimethylsiloxane groups, dimethylsiloxane-methylhexenylsiloxane copolymers blocked at both terminals by dimethylhexenylsiloxane groups and methyltrifluoropropylpolysiloxanes blocked at both terminals by dimethylvinylsiloxane groups. Single polymers, copolymers or mixtures of two or more polymers can be used.

Component (B), which is an organohydrogenpolysiloxane, is the crosslinking agent for component (A). Component (B) has an average of at least two silicon-bonded hydrogen atoms per molecule. Organic groups that are bonded with the silicon atoms in this organohydrogenpoly-siloxane in addition to hydrogen atoms can include alkyl groups, such as methyl groups, ethyl groups, propyl groups, butyl groups, hexyl groups and octyl groups; aryl groups, such as phenyl groups; and monovalent hydrocarbon groups, as exemplified by substituted hydrocarbon groups such as 3,3,3-trifluoropropyl groups. The molecular structure of this organohydrogenpolysiloxane may be straight chain, network or three-dimensional. Single polymers, copolymers or mixtures of two or more polymers can be used. The viscosity of this organohydrogenpolysiloxane at 25° C. should be in the range of 0.5 to 50,000 centipoise, and, preferably, in the range of 1 to 10,000 centipoise. The quantity of this component that is compounded should be a quantity such that the ratio of the moles of silicon-bonded hydrogen atoms in this component to the number of moles of silicon-bonded alkenyl groups in component (A) is in the range of 0.5/1 to 10/1. The organohydrogenpolysiloxane of this component can be a dimethylsiloxane-methylhydrogensiloxane copolymer blocked at both terminals by trimethylsiloxane groups, a dimethylsiloxane-methylhydrogensiloxane copolymer blocked at both terminals by dimethylhydrogensiloxane groups or a methylhydrogencyclosiloxane having three or more silicon atoms.

Component (C) is the microparticle catalyst for hydrosilylation reactions that is described above. Component (C) is comprised of (i) a metallic catalyst for hydrosilylation reactions, (ii) a disiloxane and (iii) a resin. The metallic catalyst, disiloxane and resin are described above. Component (C) is the catalyst for effecting crosslinking of component (A), the alkenyl groups bonded with the silicon atoms, and component (B), the hydrogen atoms bonded with the silicon atoms, via a hydrosilylation reaction. The microparticle catalyst of this invention has an average particle diameter of 0.1 to 20 μm; it contains the aforementioned metallic catalyst for the hydrosilylation reaction in an amount of 0.01 to 5 wt % as metal atoms and it contains 0.1 to 5 wt % of the aforementioned disiloxane. The quantity of this component that is compounded should be in the range of 0.006 to 100 parts of component (C) per 100 parts by weight of component (A), and, preferably, in the range of 0.005 to 100 and, preferably, in the range of 0.1 to 100 ppm, calculated as metal atoms, in the organosiloxane composition.

The composition of this invention is comprised of the aforementioned component (A) through component (C). In addition to these components, various additives may be compounded as long as the objectives of the invention are not impaired. Additives which can be compounded or mixed into the compositions of the present invention include, but are not limited to, powdered silicas, such as foamed silica and wet silica; powdered silica that has been subjected to surface hydrophobic treatment; crepe hardening inhibitors; polymers other than silicone; organic solvents; iron oxide; heat resistant agents, such as rare earth compounds; flame retardants, such as manganese carbonate and aerosol titanium oxide; compounds containing phosphorus such as triphenylphosphine; compounds containing nitrogen such as tributylamine, tetramethylethylenediamine and benzotriazole; compounds containing sulfur; acetylene compounds; compounds containing two or more alkenyl groups; hydroperoxy compounds; hydrosilylation reaction inhibiting compounds such as maleic acid derivatives; diatomaceous earth; calcium carbonate; glass fibers; and carbon black.

The composition of this invention can easily be obtained by mixing the aforementioned components (A) through (C) uniformly. For example, component (C) may be added to a small quantity of component (A) and uniformly dispersed in it, after which this mixture may be added to a mixture of component (A) and component (B). It is desirable that the temperature does not exceed the glass transition temperature of the resin that constitutes component (C) by more than 50° C.

The microparticle catalyst for the hydrosilylation reaction of this invention as described above is of high catalytic activity and discoloration due to decomposition products is not seen. Because of this, the microparticle catalyst of the present invention is suitable for use as catalyst for elastomers and resin compositions in which an organopolysiloxane is used as the base polymer. Further, the thermosetting silicone composition of this invention which contains the microparticle catalyst of this invention has the characteristics that it can maintain an unhardened state at room temperature for long periods and that it, after storage, it can be rapidly cured by heating. The silicone composition of this invention is extremely useful as a single solution thermosetting silicone composition.

EXAMPLES

Next, we shall present a detailed description of this invention by means of examples. In the examples, Ph indicates a phenyl group, Me indicates a methyl group, Vi indicates a vinyl group and g is grams. Viscosity is the value determined at 25° C. and cp is centipoise.

REFERENCE EXAMPLE 1

6 g of aqueous solution of chloroplatinic acid (platinum metal content of 33 wt %) and 16 g of 1,3-divinyltetramethyldisiloxane were dissolved in 35 g of isopropyl alcohol. 10 g of sodium bicarbonate was added to this solution and a reaction was carried out in a state of suspension for 30 minutes at 70° to 80° C. as the solution was being stirred. After cooling, the solid component was removed by filtration and a 4.2 wt % isopropyl alcohol solution of platinum vinyl siloxane component containing platinum metal was prepared.

EXAMPLE 1

819 g of thermoplastic silicone resin having a glass transition point of 66.5° C. as indicated by the average unit formula $(PhSiO_{3/2})_{0.78}(Me_2SiO)_{0.22}$, 72 g of thermoplastic silicone resin having a glass transition point of 65.2° C. as indicated by the average unit formula $(PhSiO_{3/2})_{0.78}(MeViSiO)_{0.22}$ and 9.0 g of syn-dimethyldiphenyldivinylsiloxane were introduced into a mixed solvent of 500 g of toluene and 4,600 g of dichloromethane in a container equipped with a stirrer and were mixed to a uniform state. Next, 88.8 g of the isopropyl alcohol solution of the platinum vinyl siloxane complex obtained in Reference Example 1 was introduced into this mixture and a uniform solution was obtained by mixing. This solution was sprayed continuously into a spray dryer tank (manufactured by Ashizawa Nitro Atomizers (Ltd.)) in which nitrogen gas was present as a hot gas flow using a two-fluid nozzle. The temperature of the hot flow of nitrogen gas was 95° C. at the inlet of the spray dryer and was 45° C. at the outlet of the spray dryer and the hot gas flow rate was 1.3 m³/minute. The operation was carried out for 1 hour under the aforementioned conditions and 415 g of the white microparticle catalyst for the hydrosilylation reaction that was produced was collected by means of a back filter. The average particle diameter of the microparticle catalyst that was obtained was 1.5 μm and the platinum content was 0.40 wt %.

COMPARATIVE EXAMPLE 1

408 g of microparticle catalyst for the hydrosilylation reaction was manufactured in the same way as in Example 1 except that the syn-dimethyldiphenyldivinylsiloxane used in Example 1 was not added and that the quantity of thermoplastic silicone resin compounded as indicated by the average unit formula $(PhSiO_{3/2})_{0.78}(Me_2SiO)_{0.22}$ was changed to 828 g. The microparticle catalyst that was obtained was grayish-white, its average particle diameter was 1.6 μm and its platinum content was 0.40 wt %.

EXAMPLE 2

20 g of fumed silica the surface of which had been subjected to hydrophobic treatment with hexamethyldisilazane and which has a specific surface area 150 m²/g was added to and thoroughly mixed with a mixture of 100 g of dimethylvinylsiloxane-terminated dimethylpolysiloxane of a viscosity of 12,000 cp and 100 g of dimethylvinylsiloxane-terminated dimethyl polysiloxane of a viscosity of 1,500 cp, after which 2.8 g of a diorganosiloxane as indicated by the average molecular formula $Me_3SiO(Me_2SiO)_3(MeHSiO)_5SiMe_3$ and 0.04 g of phenylbutynol were added and were mixed to a uniform state. Next, the microparticle catalyst for hydrosilylation reactions that was obtained in Example 1 was added to this mixture in a quantity such that the platinum metal content of the mixture was 5 ppm, after which the materials were thoroughly mixed, with a thermosetting silicone composition being prepared. The thermosetting characteristics of the thermosetting silicone composition that was obtained were determined at 130° C. and 150° C. with a model 5 Curastometer (manufactured by the Orientech Company). The thermosetting characteristics were determined taking the time until torque reached a maximum of 10% as the hardening initiation time ($T_{10}$) and the time until torque reached a maximum of 90% as hardening completion time ($T_{90}$). The thermosetting silicone composition that was obtained was introduced into a sealed container and was aged at 50° C. The number of days required up to hardening was determined and the finding was taken as storage stability. The results are shown in Table 1. On the basis of these results, it was ascertained that the hardening rate during heating was increased and that the unhardened state at room temperature could be maintained for long periods by adding syn-dimethyldiphenyldivinyldisiloxane.

COMPARATIVE EXAMPLE 2

The thermosetting silicone composition like that in Example 2 was prepared in the same way as in Example 2 except that the microparticle catalyst for hydrosilylation reactions obtained in Comparative Example 1 was added without adding the microparticle catalyst for the hydrosilylation reaction obtained in Example 1. The thermosetting properties and storage stability of the thermosetting silicone composition that was obtained were determined in the same way as in Example 2. The results are shown in Table 1.

TABLE 1

|  | Example 2 | Comparative Example 2 |
| --- | --- | --- |
| Thermosetting characteristics 130° C. | | |
| $T_{10}$ (seconds) | 72.6 | 78.0 |
| $T_{90}$ (seconds) | 84.6 | 91.2 |
| 150° C. | | |
| $T_{10}$ (second) | 23.4 | 23.4 |
| $T_{90}$ (seconds) | 29.4 | 30.0 |
| Storage stability (days) | 41 | 29 |

EXAMPLE 3

500 g of polycarbonate resin having a glass transition point of approximately 140° C. (Inpilon H-3000; manufactured by Mitsubishi Gas Chemical Company, Ltd.) was dissolved in 8.5 kg of dichloromethane and 5.0 g of syn-dimethyldiphenyldivinyldisiloxane and 1.0 kg of toluene were added and mixed. Next, 23.8 g of the isopropyl alcohol solution of the platinum vinylsiloxane complex obtained in Reference Example 1 was introduced into and mixed with this solution, by which means a uniform solution was obtained. This solution was sprayed continuously into a spray dryer tank (manufactured by Ashizawa Nitro Atomizers, Ltd.) in which nitrogen gas was present as a hot gas flow using a two-fluid nozzle. The temperature of the hot flow of nitrogen gas was 100° C. at the inlet of the spray dryer and was 70° C. at the outlet of the spray dryer and the hot gas flow rate was 1.3 m³/minute. The operation was carried out for 5 hours under the aforementioned conditions and 380 g of the white microparticle catalyst for the hydrosilylation reaction that was produced was collected by means of a back filter. The average particle diameter of the microparticle catalyst that was obtained was 1.47 μm and the platinum content was 0.2 wt %.

COMPARATIVE EXAMPLE 3

408 g of microparticle catalyst for the hydrosilylation reaction was manufactured in the same way as in Example 3 except that the syn-dimethyldiphenyldivinyldisiloxane in Example 3 was not added. The microparticle catalyst that was obtained was gray, its average particle diameter was 1.44 μm and its platinum content was 0.2 wt %.

EXAMPLE 4

20 g of fumed silica the surface of which had been subjected to hydrophobic treatment with hexamethyldisilazane and which had a specific surface area 150 m²/g was added to and thoroughly mixed with a mixture of 100 g of dimethylvinylsiloxane-terminated dimethyl polysiloxane of a viscosity of 12,000 cp and 100 g of dimethylvinylsiloxane-terminated dimethyl polysiloxane of a viscosity of 1,500 cp, after which 2.8 g of a diorganosiloxane as indicated by the average molecular formula $Me_3SiO(Me_2SiO)_3(MeHSiO)_5SiMe_3$ and 0.04 g of phenylbutynol were added and were mixed to a uniform state. Next, the microparticle catalyst for hydrosilylation reactions that was obtained in Example 3 was added to this mixture in a quantity such that the platinum metal content of the mixture was 2.5 ppm, after which the materials were thoroughly mixed, with a thermosetting silicone composition being prepared. The thermosetting characteristics of the thermosetting silicone composition that was obtained were determined at 150° C. and 170° C. with a model 5 Curastometer (manufactured by the Orientech Company). The thermosetting characteristics were determined taking the time until torque reached a maximum of 10% as the hardening initiation time ($T_{10}$) and the time until torque reached a maximum of 90% as hardening completion time ($T_{90}$). The thermosetting silicone composition that was obtained was introduced into a sealed container and was aged at 50° C. The number of days required up to hardening was determined and the finding was taken as storage stability. The results are shown in Table 2. On the basis of these results, it was ascertained that the hardening rate during heating was increased and that the unhardened state at room temperature could be maintained for long periods by adding syn-dimethyldiphenyldivinyldisiloxane.

COMPARATIVE EXAMPLE 4

The thermosetting silicone composition of Comparative Example 4 was prepared in the same way as in Example 4 except that the microparticle catalyst for hydrosilylation reactions obtained in Comparative Example 3 was added without adding the microparticle catalyst for the hydrosilylation reaction obtained in Example 3. The thermosetting properties and storage stability of the thermosetting silicone composition that was obtained were determined in the same way as in Example 4. The results are shown in Table 2.

TABLE 2

|  | Example 4 | Comparative Example 4 |
| --- | --- | --- |
| Thermosetting characteristics 150° C. | | |
| $T_{10}$ (seconds) | 130.8 | 167.4 |
| $T_{90}$ (seconds) | 162.0 | 205.2 |
| 170° C. | | |
| $T_{10}$ (seconds) | 26.4 | 30.6 |
| $T_{90}$ (seconds) | 39.6 | 48.6 |
| Storage stability (days) | 247 | 217 |

EXAMPLE 5

500 g of a copolymer of methyl methacrylate and butyl methacrylate having a glass transition point of approximately 80° C. ("ELVACITE" 2013; "ELVACITE" is a registered trademark of E.I. Du Pont De Nemours & Co. of Wilmington, Del.) was dissolved in 8.5 kg of dichloromethane and 5.0 g of syn-dimethyldiphenyldivinyldisiloxane and 1.0 kg of toluene were added and mixed. Next, 44.4 g of the isopropyl alcohol solution of the platinum vinylsiloxane complex obtained in Reference Example 1 was introduced into and mixed with this solution, by which means a uniform solution was obtained. This solution was sprayed continuously into a spray dryer tank (manufactured by Ashizawa Nitro Atomizers, Ltd.) in which nitrogen gas was present as a hot gas flow using a two-fluid nozzle. The temperature of the hot flow of nitrogen gas was 95° C. at the inlet of the spray dryer and was 50° C. at the outlet of the spray dryer and the hot gas flow rate was 1.3 m³/minute. The operation was carried out for 5 hours under the aforementioned conditions and 365 g of the white microparticle catalyst for the hydrosilylation reaction that was produced was collected by means of a back filter. The average particle diameter of the microparticle catalyst that was obtained was 1.78 μm and the platinum content was 0.4wt %.

EXAMPLE 6

20 g of fumed silica the surface of which had been subjected to hydrophobic treatment with hexamethyldisilazane and which had a specific surface area 150 m²/g was added to and thoroughly mixed with a mixture of 100 g of dimethylvinylsiloxane-terminated dimethylpolysiloxane of a viscosity of 12,000 cp and 100 g of dimethylvinylsiloxane-terminated dimethylpolysiloxane of a viscosity of 1,500 cp, after which 2.8 g of a diorganosiloxane as indicated by the average molecular formula $Me_3SiO(Me_2SiO)_3(MeHSiO)_5SiMe_3$ and 0.04 g of phenylbutynol were added and were mixed to a uniform state. Next, the microparticle catalyst for hydrosilylation reactions that was obtained in Example 5 was added to this mixture in a quantity such that the platinum metal content of the mixture was 5 ppm, after which the materials were thoroughly mixed, with a thermosetting silicone composition being prepared. The thermosetting characteristics of the thermosetting silicone composition that was obtained were determined at 130° C. and 150° C. with a model 5 Curastometer (manufactured by the Orientech Company). The thermosetting characteristics were determined taking the time until torque reached a maximum of 10% as the hardening initiation time ($T_{10}$) and the time until torque reached a maximum of 90% as hardening completion time ($T_{90}$). At 130° C., the $T_{10}$ value of the thermosetting silicone composition that was obtained was 85.6 seconds and the $T_{90}$ value was 98.2 seconds. At 150° C., the $T_{10}$ value was 32.6 seconds and the $T_{90}$ value was 46.2 seconds. When this thermosetting silicone composition was aged at 50° C., an unhardened state could be maintained for 87 days.

EXAMPLE 7

500 g of resin of a glass transition point of approximately 140° C. ("IUPILON" H-3000; "IUPILON" is a registered trademark of Mitsubishi Gas Chemical Company, Inc. of Tokyo, Japan.) was dissolved in 8.5 kg of dichloromethane and 5.0 g of syn-tetraphenyldivinyldisiloxane and 1.0 kg of toluene were added and mixed. Next, 23.8 g of the isopropyl alcohol solution of the platinum vinylsiloxane complex obtained in Comparative Example 1 was introduced into and mixed with this solution, by which means a uniform solution was obtained. This solution was sprayed continuously into a spray dryer tank (manufactured by Ashizawa Nitro Atomizers, Ltd.) in which nitrogen gas was present as a hot gas flow using a two-fluid nozzle. The temperature of the hot flow of nitrogen gas was 100° C. at the inlet of the spray dryer and was 70° C. at the outlet of the spray dryer and the hot gas flow rate was 1.3 m³/minute. The operation was carried out for 5 hours under the aforementioned conditions and 385 g of the white microparticle catalyst for the hydrosilylation reaction that was produced was collected by means of a back filter. The average particle diameter of the microparticle catalyst that was obtained was 1.52 μm and the platinum content was 0.2 wt %.

EXAMPLE 8

20 g of fumed silica the surface of which had been subjected to hydrophobic treatment with hexamethyldisilazane and which had a specific surface area 150 m²/g was added to and thoroughly mixed with a mixture of 100 g of dimethylvinylsiloxane-terminated dimethylpolysiloxane of a viscosity of 12,000 cp and 100 g of dimethylvinylsiloxane-terminated dimethylpolysiloxane of a viscosity of 1,500 cp, after which 2.8 g of a diorganosiloxane as indicated by the average molecular formula $Me_3SiO(Me_2SiO)_3(MeHSiO)_5SiMe_3$ and 0.04 g of phenylbutynol were added and were mixed to a uniform state. Next, the microparticle catalyst for hydrosilylation reactions that was obtained in Example 7 was added to this mixture in a quantity such that the platinum metal content of the mixture was 2.5 ppm, after which the materials were thoroughly mixed, with a thermosetting silicone composition being prepared. The thermosetting characteristics of the thermosetting silicone composition that was obtained were determined at 150° C. and 170° C. with a model 5 Curastometer (manufactured by the Orientech Company). The thermosetting characteristics were determined taking the time until torque reached a maximum of 10% as the hardening initiation time ($T_{10}$) and the time until torque reached a maximum of 90% as hardening completion time ($T_{90}$). At 150° C., the $T_{10}$ value of the thermosetting silicone composition that was obtained was 122.1 seconds and the $T_{90}$ value was 157.1 seconds. At 170° C., the $T_{10}$ value was 26.0 seconds and the $T_{90}$ value was 38.1 seconds. When this thermosetting silicone composition was aged at 50° C., an unhardened state could be maintained for 268 days.

The microparticle catalyst for hydrosilylation reactions of this invention is comprised of a metal catalyst for hydrosilylation reactions, specified disiloxanes and a resin having a glass transition point of 40° to 200° C., for which reason it has the characteristic of high catalytic activity. In addition, the thermosetting silicone composition that contains the microparticle catalyst of this invention has the characteristics that it is of superior storage stability and that an unhardened state can be maintained for a long period.

That which is claimed is:

1. A microparticle catalyst comprising:
   (i) a metallic catalyst in an amount sufficient to provide 0.01 to 5 wt % metal atoms in the microparticle catalyst;
   (ii) 0.1 to 5 wt % of a disiloxane having the general formula

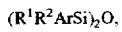

$(R^1R^2ArSi)_2O$, wherein $R^1$ is an alkenyl group, $R^2$ is a monovalent hydrocarbon group and Ar is an aryl group; and
   (iii) a resin having a glass transition temperature of 40° to 200° C.; wherein said microparticle catalyst has an average particle diameter of 0.1 to 20 μm.

2. The microparticle catalyst according to claim 1 wherein the metallic catalyst is a platinum catalyst.

3. The microparticle catalyst according to claim 1 wherein $R^1$ is a vinyl group and Ar is a phenyl group.

4. The microparticle catalyst according to claim 1 wherein the resin is selected from the group consisting of silicone resins, polycarbonate resins and acrylic resins.

5. The microparticle catalyst according to claim 4 wherein the silicone resin has a vinyl group.

6. The microparticle catalyst according to claim 4 wherein the microparticle catalyst comprises 0.05 to 2 wt % metal atoms.

7. A product from the incipient materials:
   (i) a metallic catalyst in an amount sufficient to provide 0.01 to 5 wt % metal atoms in the microparticle catalyst;
   (ii) 0.1 to 5 wt % of a disiloxane having the general formula

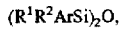

$(R^1R^2ArSi)_2O$, wherein $R^1$ is an alkenyl group, $R^2$ is a monovalent hydrocarbon group and Ar is an aryl group; and
   (iii) a resin having a glass transition temperature of 40° to 200° C.

8. An organosiloxane composition comprising:
   (A) 100 parts by weight of an organopolysiloxane having an average of at least two silicon-bonded alkenyl groups per molecule;
   (B) an organohydrogenpolysiloxane having an average of at least two silicon-bonded hydrogen atoms per molecule, in an amount such that the ratio of the number of moles of silicon-bonded hydrogen atoms bonded in component (B) to the number of moles of silicon-bonded alkenyl groups in component (A) is in the range of 0.5/1 to 10/1; and
   (C) 0.005 to 100 parts by weight of a microparticle catalyst, comprising:
     (i) a metallic catalyst in an amount sufficient to provide 0.01 to 5 wt % of metal atoms in the microparticle catalyst;
     (ii) 0.1 to 5 wt % of a disiloxane having the general formula

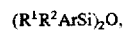

$(R^1R^2ArSi)_2O$, wherein $R^1$ is an alkenyl group, $R^2$ is a monovalent hydrocarbon group and Ar is an aryl group; and
     (iii) a resin having a glass transition temperature of 40° to 200 ° C.; wherein said microparticle catalyst has an average particle diameter of 0.1 to 20 μm.

9. The organosiloxane composition of claim 8 wherein the viscosity at 25° C. of component (A) is 10 to 1,000,000 centipoise.

10. The organosiloxane composition of claim 8 wherein this viscosity at 25° C. of component (B) is 0.5 to 50,000 centipoise.

11. The organosiloxane composition of claim 10 wherein the viscosity at 25° C. of component (B) is 1 to 10,000 centipoise.

12. The organosiloxane composition of claim 8 wherein the microparticle catalyst comprises 0.05 to 2 wt % metal atoms.

13. The organosiloxane composition of claim 8 wherein component (C) is present in an amount providing 0.005 to 100 parts per 100 parts by weight of component (A).

14. The organosiloxane composition of claim 13 wherein component (C) is present in an amount providing 0.1 to 100 ppm of metal atoms of metallic catalyst in the organosiloxane composition.

15. A product from the incipient materials:
   (A) 100 parts by weight of an organopolysiloxane having an average of at least two silicon-bonded alkenyl groups per molecule;
   (B) an organohydrogenpolysiloxane having an average of at least two silicon-bonded hydrogen atoms per molecule, in an amount such that the ratio of the number of moles of silicon-bonded hydrogen atoms bonded in component (B) to the number of moles of silicon-bonded alkenyl groups in component (A) is in the range of 0.5/1 to 10/1; and (C) 0.005 to 100 parts by weight of a microparticle catalyst for hydrosilylation reactions, said microparticle catalyst comprising:
  (i) a metallic catalyst in an amount sufficient to provide 0.01 to 5 wt % of metal atoms in the microparticle catalyst;
  (ii) 0.1 to 5 wt % of a disiloxane having the general formula $$(R^1R^2ArSi)_2O,$$

wherein $R^1$ is an alkenyl group, $R^2$ is a monovalent hydrocarbon group and Ar is an aryl group; and (iii) a resin having a glass transition temperature of 40° to 200° C.

* * * * *